(12) United States Patent
Teufel et al.

(10) Patent No.: US 9,393,888 B2
(45) Date of Patent: Jul. 19, 2016

(54) LOCKING DEVICE FOR A FOLDABLE BACKREST OF A SEAT

(75) Inventors: Ingo Teufel, Rockenhausen (DE); Kai Schumann, Rieschweiler-Mühlbach (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 359 days.

(21) Appl. No.: 14/001,146

(22) PCT Filed: Apr. 12, 2012

(86) PCT No.: PCT/EP2012/001577
§ 371 (c)(1),
(2), (4) Date: Nov. 4, 2013

(87) PCT Pub. No.: WO2012/143102
PCT Pub. Date: Oct. 26, 2012

(65) Prior Publication Data
US 2015/0040623 A1      Feb. 12, 2015

(30) Foreign Application Priority Data

Apr. 21, 2011   (DE) .......................... 10 2011 018 658

(51) Int. Cl.
*E05B 13/00*         (2006.01)
*B60N 2/36*          (2006.01)
*B60N 2/20*          (2006.01)

(52) U.S. Cl.
CPC ................ *B60N 2/366* (2013.01); *B60N 2/206* (2013.01); *E05B 13/004* (2013.01); *Y10T 70/577* (2015.04); *Y10T 70/5996* (2015.04)

(58) Field of Classification Search
CPC ...... E05B 13/004; B60N 2/206; B60N 2/366; Y10T 70/577; Y10T 70/5996
USPC ................. 70/208, 210, 261; 292/210, 336.3, 292/DIG. 31; 297/378.12, 378.13
See application file for complete search history.

(56) References Cited

U.S. PATENT DOCUMENTS 2,613,523 A * 10/1952 Holmsten ............... E05C 3/043
                                                           292/210
3,429,153 A *  2/1969 Magyar ................... E05B 83/30
                                                           292/210

(Continued)

FOREIGN PATENT DOCUMENTS

DE         196 53 220 A1    6/1997
DE         199 16 223 C1    2/2001

(Continued)

OTHER PUBLICATIONS

International Preliminary Report on Patentability mailed Oct. 22, 2013, as received in corresponding International Application No. PCT/EP2012/001577.

(Continued)

*Primary Examiner* — Lloyd Gall
(74) *Attorney, Agent, or Firm* — Foley & Lardner LLP

(57) ABSTRACT

A locking device for a foldable backrest of a seat, has a locking housing with a handle, the handle being pivotably between locking and unlocking positions and by which a pawl can be carried between retaining and non-retaining positions, and has a blocking element which is movable by a closable lock manually between a blocking position blocking the handle and a release position releasing the handle. The blocking element is a locking bolt mounted pivotably in the locking housing between the blocking and release positions and having release and blocking recesses. A blocking pin, in the release position of the locking bolt, projects into the release recess and is freely movable between the locking and unlocking positions. The blocking pin, in the blocking position of the locking bolt and the locking position of the handle, protrudes into the blocking recess and is blocked against pivoting into the unlocking position.

9 Claims, 5 Drawing Sheets

(56) References Cited

U.S. PATENT DOCUMENTS

| | | | | |
|---|---|---|---|---|
| 4,424,691 | A * | 1/1984 | Foshee | E05B 55/005 292/336.3 |
| 4,556,244 | A * | 12/1985 | Bisbing | E05B 17/0025 292/336.3 |
| 4,813,722 | A | 3/1989 | Viscome et al. | |
| 5,454,239 | A * | 10/1995 | Esaki | E05B 5/003 292/202 |
| 6,606,889 | B1 * | 8/2003 | Tweedy | E05B 13/002 292/DIG. 31 |
| 6,978,645 | B2 * | 12/2005 | Shimon | E05B 17/0058 70/379 R |
| 8,393,682 | B2 | 3/2013 | Hosoda et al. | |
| 8,857,230 | B1 * | 10/2014 | Misner | E05B 17/0025 292/229 |
| 8,998,332 | B2 * | 4/2015 | Teufel | B60N 2/01516 297/378.12 |
| 9,180,799 | B2 * | 11/2015 | Teufel | B60N 2/366 |

FOREIGN PATENT DOCUMENTS

| | | |
|---|---|---|
| DE | 101 46 528 A1 | 4/2003 |
| DE | 10 2011 018 658 B4 | 11/2012 |
| JP | 2011-051574 | 3/2011 |

OTHER PUBLICATIONS

Office Action dated Oct. 28, 2014, in corresponding Korean Application No. 10-2013-7030922 and English translation, 16 pages.
International Search Report dated Jun. 27, 2012 received in International Application No. PCT/EP2012/001577.
Office Action dated Aug. 19, 2014, in corresponding Japanese Application No. 2013-553850 and English translation, 5 pages.

* cited by examiner

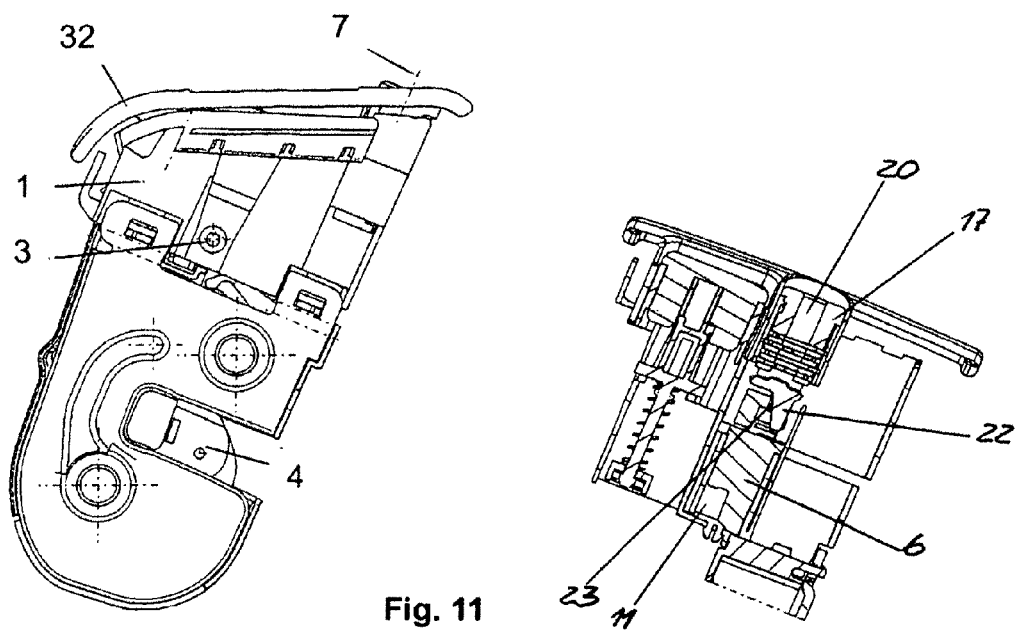
Fig. 8
Fig. 11
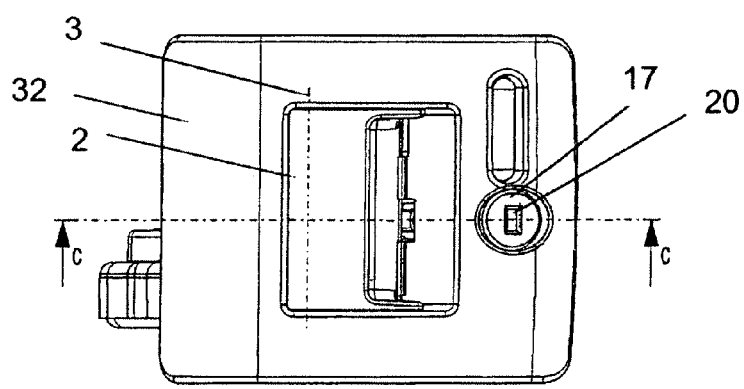
Fig. 9
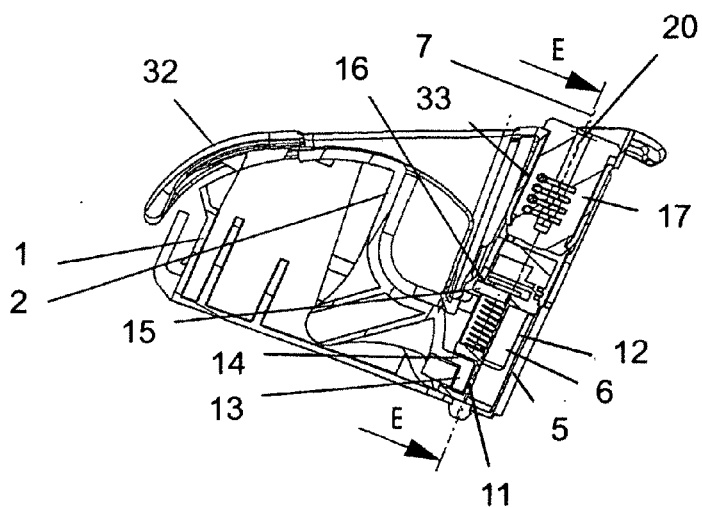
Fig. 10

LOCKING DEVICE FOR A FOLDABLE BACKREST OF A SEAT

CROSS REFERENCE TO RELATED APPLICATIONS

The present application is a U.S. National Stage of International Application No. PCT/EP2012/001577 filed on Apr. 12, 2012, which claims the benefit of German Patent Application No. 10 2011 018 658.1 filed on Apr. 21, 2011, the entire disclosures of all of which are incorporated herein by reference.

FIELD

The invention relates to a locking device for a foldable backrest of a seat, in particular a rear seat in a motor vehicle, having a locking housing in which there is arranged a handle which can be pivoted about a pivot axis between a locking position and an unlocking position and by means of which a locking detent can be carried between a locking position and an unlocking position, having a blocking element which can be moved by means of a closable lock manually between a blocking position which blocks the handle in the locking position thereof and a release position which releases the handle.

BACKGROUND

Such a locking device serves to secure a foldable backrest in the upright position thereof so that no undesirable folding of the backrest can occur. However, the folding of the backrest enables a larger luggage space to be provided.

The closeability of the backrest which is located in the upright position thereof is intended, for example, with a rear seat, to prevent entry to the luggage space from the passenger space. The closeability consequently constitutes protection against theft.

To this end, it is known to construct the blocking element as a linearly displaceable blocking bar by means of which the pivotability of the handle can be blocked in the locking position thereof.

This construction requires a large amount of structural space.

U.S. Pat. No. 4,613,722 discloses a closable locking device in which pivoting of the handle is not possible in the closed state.

DE 101 46 528 A1 discloses a closable locking device in which a pivoting of the handle is possible in the closed state, without the locking detent also being carried. A similar locking device is also disclosed in DE 199 16 223 C1.

BRIEF SUMMARY

The problem addressed by the invention is therefore to provide a locking device of the type mentioned in the introduction, which requires a small amount of structural space and which requires only a few simply constructed components.

This problem is solved according to the invention with a locking device that includes an arrangement where the blocking element is a closure bar which is supported in the locking housing so as to be able to be pivoted about a bar axis between the blocking position and the release position and which has a release recess and a blocking recess and in that the handle has a blocking pin which, in the release position of the closure bar, protrudes into the release recess and can be freely moved in the release recess by the handle being pivoted between the locking position and the unlocking position, and which, in the blocking position of the closure bar and the locking position of the handle, protrudes into the blocking recess and is blocked against pivoting into the unlocking position.

Owing to the pivotability of the closure bar, only a small amount of structural space in which the closure bar moves is required.

The construction of the release recess and the blocking recess in the closure bar and the blocking pin of the handle result in a simple construction of the components of the closure bar and handle which act together.

A compact construction is achieved if the bar axis extends transversely relative to the pivot axis of the handle.

The closure bar which is secured against axial displacement may have a release groove which extends parallel with the bar axis, which forms the release recess and which in the release position of the closure bar faces the handle and into which the blocking pin protrudes, an end of the release groove opening in an at least partially radially peripheral blocking groove which forms the blocking recess and one side wall of which forms a blocking stop which the blocking pin can be abutted so as to block a movement of the handle from the locking position into the unlocking position.

Furthermore, when the handle is actuated, the closure bar cannot thereby be closed.

Owing to a short pivot path of the closure bar, the blocking pin is moved in a relative manner from the release groove into the blocking groove and vice versa.

The axial securing of the closure bar prevents displacement of the closure bar if attempts are made, when the blocking pin is located in the blocking groove, to move the handle from the locking position into the unlocking position.

Even great forces are reliably supported in a simple manner when the closure bar has a radially protruding securing attachment which, when the closure bar is in the blocking position, is in abutment axially relative to the bar axis with at least one securing stop which is secured to the housing so as to support a force which is applied to the closure bar by the blocking pin which is acted on by the handle in the unlocking position.

At the same time, ease of assembly of the closure bar is achieved by means of plug type assembly.

Both for the closeability of the locking device and in order to pivot the closure bar, the closure bar may be able to be pivotably driven by means of a key-actuatable closure cylinder between the release position and the blocking position.

If the closure cylinder is protected against axial displaceability and supported pivotably about the bar axis in the locking housing or in a closure cylinder guide, and if the closure cylinder engages axially with a closure pin which is parallel with the bar axis and which protrudes in the direction towards the closure bar into a corresponding closure recess of the closure bar, the coaxial arrangement of the closure cylinder and closure bar leads to a small requirement for structural space. Furthermore, a coupling with the closure bar is achieved automatically simply by means of assembly of the closure cylinder and consequently in an easy-to-assemble manner.

If the closure bar is resiliently loaded into the release position thereof by means of a pretensioned spring, the closure cylinder, after being introduced into the guide thereof, is forcibly retained in the locking housing in the release position thereof.

A space-saving integrated structure is achieved when the spring is a helical spring, one end of which is supported on the closure bar and the second end of which is supported on the locking housing, the spring being arranged in a coaxially cylindrical spring chamber of the closure bar from which the second end of the helical spring protrudes radially through a partially peripheral slot.

If the locking device is intended to be able to be transported without a closure cylinder and the closure bar is intended to be retained in the correct assembly position thereof so as not to be able to be rotated, the closure bar may have a spring catch which can be moved from an assembly position protruding radially from the closure bar counter to a resilient force into a radially non-protruding position for use and which, in the assembly position thereof, protrudes with the radially protruding free end thereof into a catch groove of the locking housing that is parallel with the bar axis.

To this end, in a simple manner, the spring catch may be a resilient arm which is fixedly arranged with one end thereof on the closure bar, which freely protrudes in a radial manner and which in the relaxed assembly position thereof protrudes radially from the closure bar with the other end thereof and can be redirected by means of application of axial force from the radial assembly position into the position for use thereof, in which it extends in a manner inclined relative to the bar axis through an angle which differs from 90°.

If the resilient arm is acted on by the free end of the closure pin of the closure cylinder which is located in its assembly position in the locking housing so as to be deflected into the position for use thereof, the resilient arm is necessarily also deflected with the installation of the closure cylinder.

If the backrest forms a partition wall between the passenger space and a luggage space of the motor vehicle, this backrest position can be closed by means of the look when the backrest is in the position for use and the locking device is locked. It is then not possible to reach the luggage space via the passenger space.

BRIEF DESCRIPTION OF SEVERAL VIEWS OF THE DRAWINGS

The invention is explained in greater detail below with reference to an advantageous embodiment illustrated in the drawings. However, the invention is not limited to this embodiment. In the drawings:

FIG. 8 is a side view of the locking device according to FIG. 1 with the handle in the locking position and with the closure bar in the blocking position, FIG. 9 is a plan view of the locking device according to FIG. 8, FIG. 10 is a sectioned view along the line C-C in FIG. 9, FIG. 11 is a sectioned view along the line E-E in FIG. 10.

DETAILED DESCRIPTION

The locking device illustrated is arranged on a foldable backrest of a seat of a motor vehicle and has a locking housing 1, to the upper side of which a cover 32 is secured.

Figure 1:
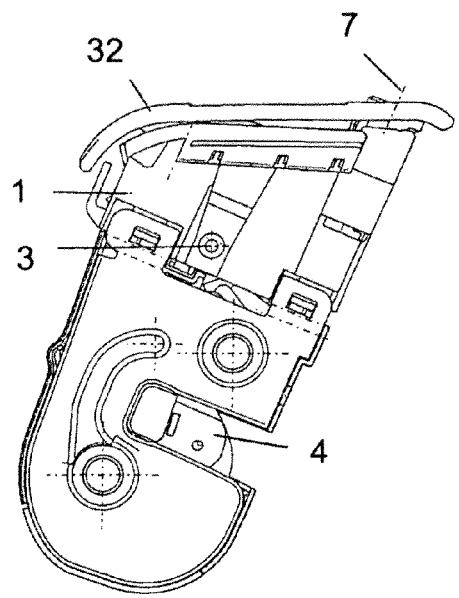
FIG. 1 is a side view of a locking device having a handle in the locking position and having a closure bar in the release position.
Figure 2:
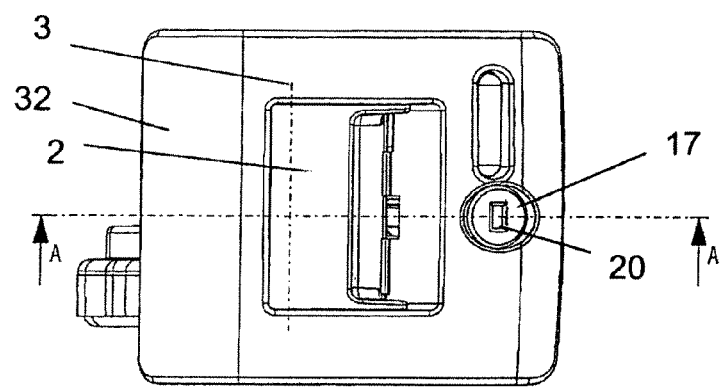
FIG. 2 is a plan view of the locking device according to FIG. 1.
Figure 3:
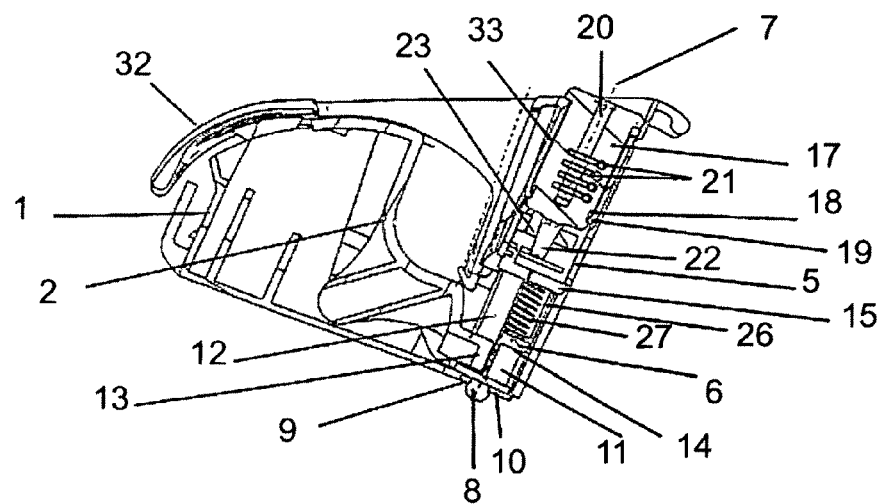
FIG. 3 is a sectioned view along the line A-A in FIG. 2.
Figure 4:
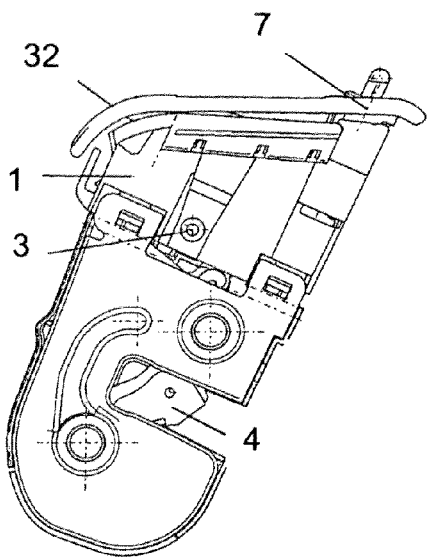
FIG. 4 is a side view of the locking device according to FIG. 1 with the handle in the unlocking position and with the closure bar in the release position.
Figure 7:
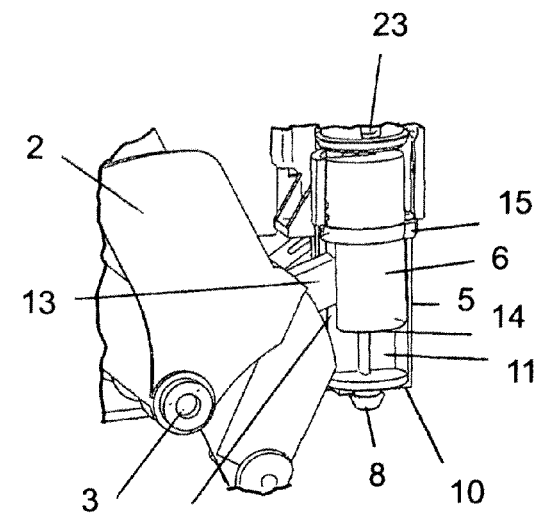
FIG. 7 is a perspective cut-out in the region of the closure bar of the locking device according to FIG. 4.
Figure 5:
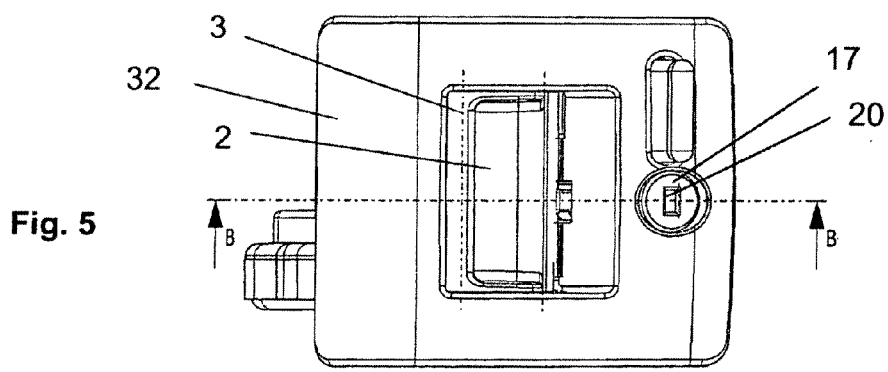
FIG. 5 is a plan view of the locking device according to FIG. 4.
Figure 6:
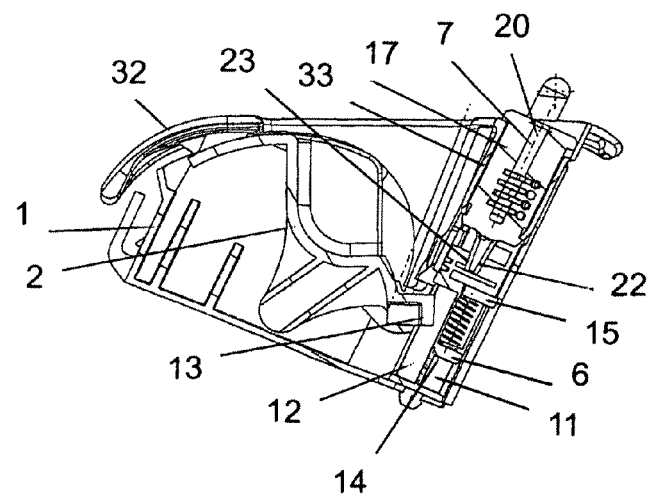
FIG. 6 is a sectioned view along the line B-B in FIG. 5.
Figure 12:
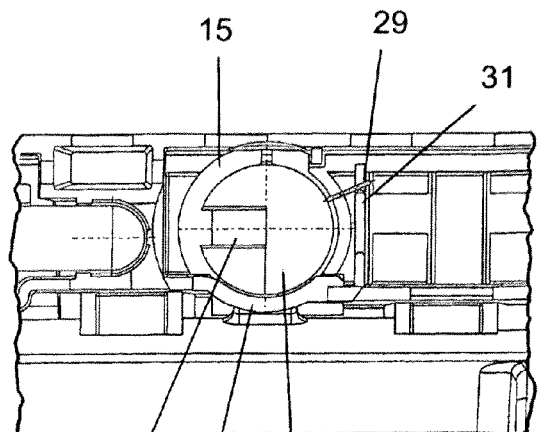
FIG. 12 is a plan view of the region of the closure bar of the locking device according to FIG. 1 without a cover in a release position.
Figure 13:
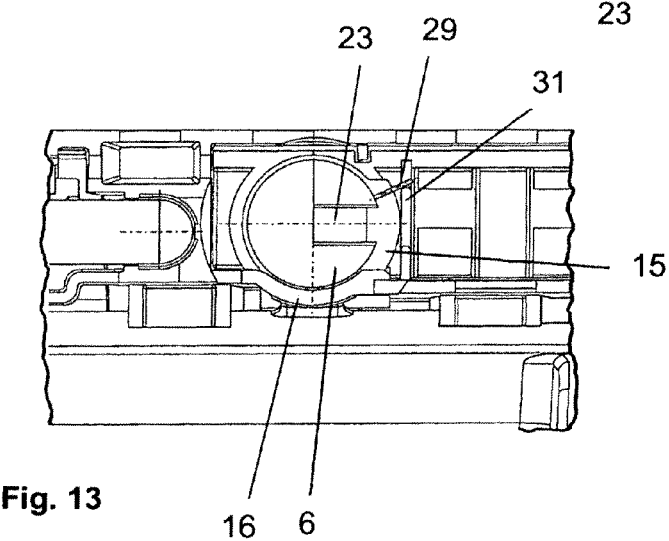
FIG. 13 is a plan view of the region of the closure bar of the locking device according to FIG. 1 without a cover in a blocking position.
Figure 14:
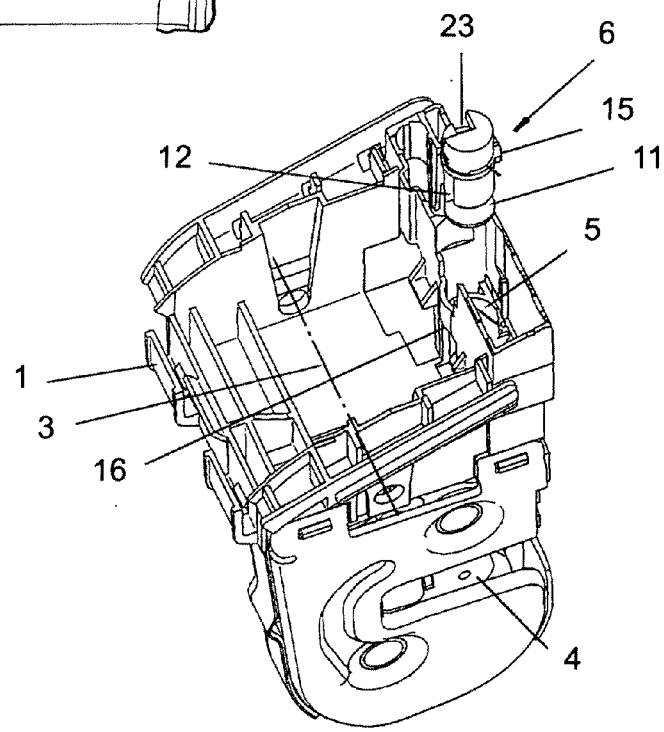
FIG. 14 is a perspective view of the housing of the locking device according to FIG. 1.
Figure 15:
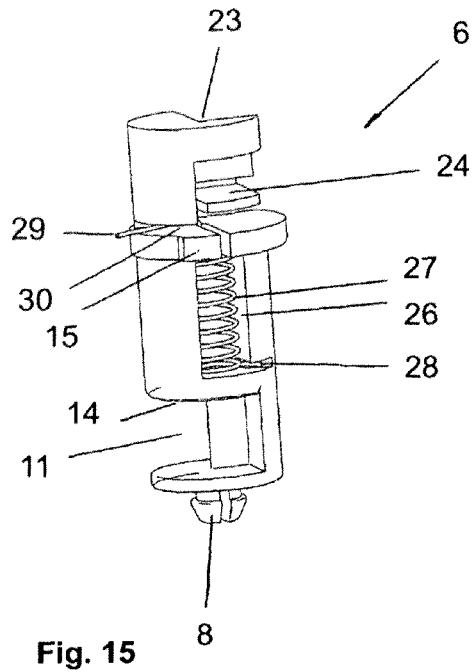
FIG. 15 is a perspective view of the closure bar of the locking device according to FIG. 1.
Figure 16:
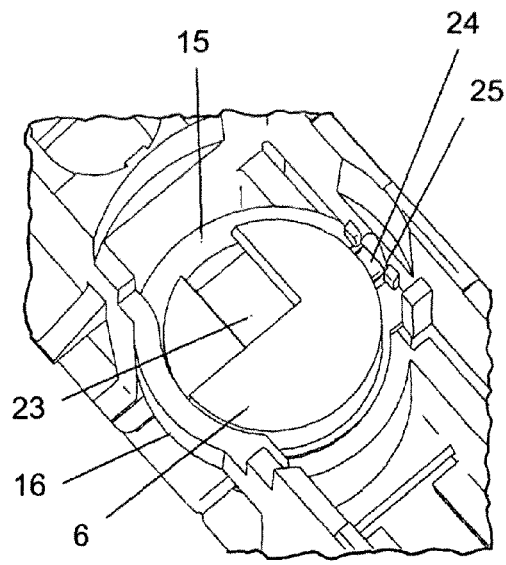
FIG. 16 is a perspective plan view of a cut-out of the locking device according to FIG. 1 in the region of the closure bar.
Figure 17:
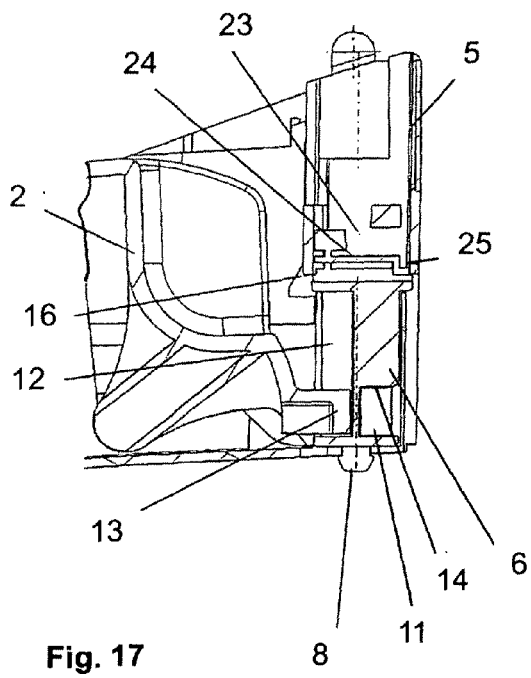
FIG. 17 is a sectioned side view of a cut-out of the locking device according to FIG. 1 in the region of the handle and closure bar without a closure cylinder.
Figure 18:
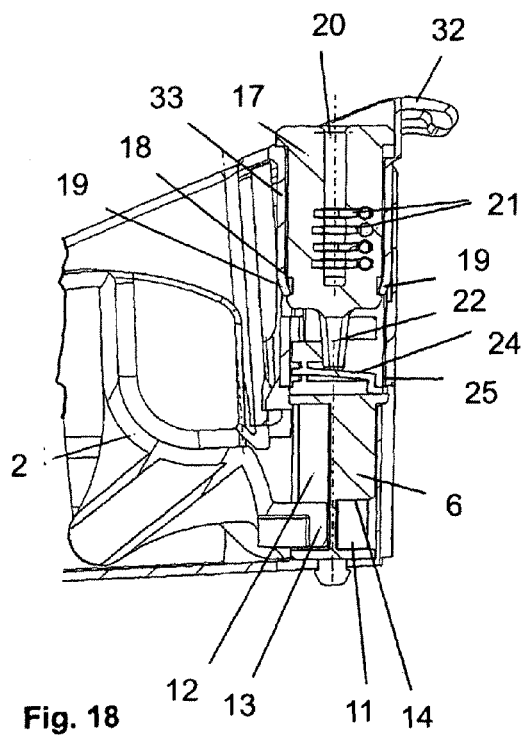
FIG. 18 is the side view according to FIG. 17 with a closure cylinder.

In the locking housing 1, there is arranged a handle 2 which can be pivoted about a pivot axis 3 between a locking position (FIGS. 1 to 3 and FIGS. 8 to 11) and an unlocking position (FIGS. 4 to 7).

Using the handle 2, a locking detent 4 can be moved between a locking position (FIGS. 1 and 8) and an unlocking position (FIG. 4) in known manner.

In a cylindrical guide 5 of the locking housing 1, a closure bar 6 is further supported, with spacing relative to the pivot axis 3, so as to be able to be pivoted about a bar axis 7 which extends transversely relative to the pivot axis 3.

In order to axially position the closure bar 6, it has at the lower end thereof a coaxial clip 8 which, in the assembly position of the closure bar 6, is clipped into a hole 9 of a base 10 of the locking housing 1 that terminates the cylindrical guide 5 at the lower end thereof.

The closure bar 6 which has a cylindrical peripheral contour has in the lower end region thereof a blocking groove 11 which extends radially through approximately 200°.

There opens in one end of the blocking groove 11 a release groove 12 which extends axially in an upward direction therefrom.

The closure bar 6 can be pivoted about the bar axis 7 between a release position (FIGS. 1 to 7) and a blocking position (FIGS. 8 to 11).

The handle 2 has a blocking pin 13 which protrudes radially relative to the pivot axis 3 and which, depending on the position of the handle 2, protrudes into the blocking groove 11 or the release groove 12.

In the release position of the closure bar 6, the release groove 12 faces the handle 2 with the groove opening thereof and the blocking pin 13 can move freely in the release groove 12 in the longitudinal direction thereof.

The width of the blocking pin 13 corresponds to the width of the release groove 12.

Owing to the free movability of the blocking pin 13, in the release groove 12 which extends transversely relative to the pivot axis 3, the handle 2 can also be pivoted freely between the locking position and unlocking position thereof and the locking decent 4 can thus be moved between the locking position and unlocking position thereof.

At the some time, when the handle is actuated, the closure bar 6 cannot be pivoted about the bar axis 7 thereof into the blocking position thereof.

The extent of the blocking pin 13 transversely relative to the pivot axis 3 corresponds to the width of the blocking groove 11.

In the blocking position of the closure bar 6, the release groove 12 is pivoted out of its position directed towards the handle 2 so that only the blocking groove 11 is directed towards the handle 2.

To this end, the handle 2 first had to be pivoted into the locking position thereof, whereby the blocking pin 13 is moved into the blocking groove 11.

By the closure bar 6 being pivoted into the blocking position thereof, the blocking pin 13 is guided between the two side walls of the blocking groove 11, the upper side wall forming a blocking stop 14 which the blocking pin 13 abuts in a blocking manner when an attempt is made to pivot the handle 2 from the locking position thereof in the direction of the unlocking position thereof and prevents such pivotability of the handle 2.

The closure bar 6 has a radially protruding securing attachment 15, which is constructed so as to extend in a radially peripheral manner through approximately 180° and which, in the blocking position of the closure bar 6, engages behind a securing stop 16 which is fixed to the housing in such a manner that a force acting on the closure bar 6 by means of the blocking pin 13 which is acted on by the handle 2 in the unlocking position is supported on the securing stop 16 by means of the securing attachment 15.

At the end opposite the coaxial clip 8, there is inserted into a sleeve-like closure cylinder guide 33 of the cover 32 that is coaxial with the cylindrical guide 5 a closure cylinder 17 which has a radially peripheral annular groove 18 in which clip-fit projections 19 of the closure cylinder guide 33 engage and secure the closure cylinder 17 axially in the closure cylinder guide 33, but enable a rotation about the bar axis 7.

The closure cylinder 17 has a key opening 20, into which a key can be inserted from the outer side. Owing to the key which is introduced into the key opening 20 and which is turned in the release direction, locking attachments 21 of the closure cylinder 17 are moved radially from their radially protruding bar position engaging in bar openings of the closure cylinder guide into the closure cylinder 17 and then the closure cylinder 17 is pivoted about the longitudinal axis thereof which constitutes the rotation axis thereof.

At the end thereof facing the closure bar 6, the closure cylinder 17 has a closure pin 22 which protrudes parallel with the rotation axis of the closure cylinder 17 and which engages in a corresponding closure recess 23 at the end face of the closure bar 6 facing the closure cylinder 17.

In this instance, the rotation axis of the closure cylinder 17 and the bar axis 7 are in alignment with each other. It is also conceivable for the rotation axis of the closure cylinder 17 to be arranged offset parallel with the bar axis 7 or to form an angle therewith.

Owing to the rotation of the key in the release direction, the closure bar 6 is also pivoted from the blocking position thereof into the release position thereof by means of the closure cylinder 17.

Accordingly, in the opposing rotation direction of the key, the closure bar 6 is pivoted from the release position into the blocking position.

If the key is then removed again, the locking attachments 21 are also radially deployed again and engage in the bar openings of the closure cylinder guide 33 so that the closure cylinder 17 is rotationally secured.

The closure bar 6 has a radially freely protruding resilient arm 24 which is securely arranged on the closure bar 6 with one end thereof and which, in the relaxed assembly position thereof, protrudes with the other end thereof radially from the peripheral contour of the closure bar 6 and, when the closure cylinder 17 is not yet assembled but the closure bar 6 is already assembled, protrudes into a catch groove 25 which is parallel with the bar axis 7 in the wall of the cylindrical guide 5 and thus ensures the correct assembly position of the closure bar 6.

If the closure cylinder 17 is also assembled, the free end of the closure pin 22 that presses on the resilient arm 24 redirects it in such a manner that the free end thereof no longer protrudes into the catch groove 25. Consequently, the locking bar 6 can now also be pivoted about the bar axis 7.

There is coaxially constructed in the closure bar 6 a spring chamber 26 in which a pretensioned rotary spring which is constructed as a helical spring 27 is arranged.

One radially directed end 28 of the helical spring 27 is supported on the closure bar 6, whilst the other end 29 of the helical spring 27 protrudes radially from the closure bar 6 by means of a partially peripheral slot 30 and is supported on a stop 31 of the locking housing 1.

Owing to the pretensioning of the helical spring 27, the closure bar 6 is always pretensioned into the release position thereof.

When the closure cylinder 17 and the closure bar 6 are rotated into the blocking position by means of the key, the force of the helical spring 27 must always also be overcome, whilst the resilient force has a supportive effect during rotation into the release position.

Both the helical spring 27 and the resilient arm 24 which is still in the catch groove 25 ensure that, during the assembly of the locking device, when the closure bar 6 and the closure cylinder 17 are installed, the closure bar 6 is always located in a defined manner in the release position so that a collision with the blocking pin 13 is not possible.

When the helical spring 27 is present, the securing of the assembly by means of the resilient arm 24 may be dispensed with.

Furthermore, it is ensured by means of the helical spring 27 that, when the closure member 6 is subsequently removed, the handle 2 can still be pivoted.

The features disclosed in the above description, the claims and the drawings may be significant both individually and in combination for the implementation of the invention in its various embodiments.

LIST OF REFERENCE NUMERALS

1 Locking housing
2 Handle
3 Pivot axis
4 Locking detent
5 Cylindrical guide
6 Closure bar
7 Bar axis
8 Coaxial clips
9 Hole
10 Base
11 Blocking groove
12 Release groove
13 Blocking pin
14 Blocking stop
15 Securing attachment
16 Securing stop
17 Closure cylinder
18 Annular groove
19 Clip-fit projections
20 Key opening 21 Bar attachments
22 Closure pin
23 Closure recess
24 Resilient arm
25 Catch groove
26 Spring chamber
27 Helical spring
28 First end of the helical spring
29 Second end of the helical spring
30 Slot
31 Stop
32 Cover
33 Closure cylinder guide

The invention claimed is:

1. A locking device for a foldable backrest of a seat, comprising:
   a locking housing in which there is arranged a handle which can be pivoted about a pivot axis between a locking position and an unlocking position and by which a locking detent can be carried between a locking position and an unlocking position;
   a blocking element which can be moved by a closable lock manually between a blocking position which blocks the handle in the locking position thereof and a release position which releases the handle,
   wherein the blocking element is a closure bar which is supported in the locking housing so as to be able to be pivoted about a bar axis between the blocking position and the release position and which has a release recess and a blocking recess, and
   wherein the handle has a blocking pin which, in the release position of the closure bar, protrudes into the release recess and can be freely moved in the release recess by the handle being pivoted between the locking position and the unlocking position, and which, in the blocking position of the closure bar and the locking position of the handle, protrudes into the blocking recess and is blocked against pivoting into the unlocking position,
   wherein the closure bar has a spring catch which can be moved from an assembly position protruding radially from the closure bar counter to a resilient force into a radially non-protruding position for use and which, in the assembly position thereof, protrudes with the radially protruding free end thereof into a catch groove of the locking housing that is parallel with the bar axis.

2. The locking device as claimed in claim 1, wherein the bar axis extends transversely relative to the pivot axis of the handle.

3. The locking device as claimed in claim 2, wherein the closure bar which is secured against axial displacement has a release groove which extends parallel with the bar axis, which forms the release recess and which in the release position of the closure bar faces the handle and into which the blocking pin protrudes, an end of the release groove opening in an at least partially radially peripheral blocking groove which forms the blocking recess and one side wall of which forms a blocking stop which the blocking pin can abut so as to block a movement of the handle from the locking position into the unlocking position.

4. The locking device as claimed in claim 3, wherein the closure bar has a radially protruding securing attachment which, when the closure bar is in the blocking position, is in abutment axially relative to the bar axis with at least one securing stop which is secured to the housing so as to support a force which is applied to the closure bar by the blocking pin which is acted on by the handle in the unlocking position.

5. The locking device as claimed in claim 1, wherein the closure bar can be pivotably driven by a key-actuatable closure cylinder between the release position and the blocking position.

6. The locking device as claimed in claim 1, wherein the closure bar is resiliently loaded into the release position thereof by a pretensioned spring.

7. The locking device as claimed in claim 1, wherein the spring catch is a resilient arm which is fixedly arranged with one end thereof on the closure bar, which protrudes freely in a radial manner and which in the relaxed assembly position thereof protrudes radially from the closure bar with the other end thereof and can be redirected by application of axial force from the radial assembly position into the position for use thereof, in which it extends in a manner inclined relative to the bar axis through an angle which differs from 90°.

8. The locking device as claimed in claim 5, wherein the closure cylinder has a closure pin which protrudes parallel with the rotation axis of the closure cylinder, and which engages in a corresponding closure recess at the end face of the closure bar facing the closure cylinder, and in that a resilient arm is acted on by the free end of the closure pin of the closure cylinder which is located in its assembly position in the locking housing so as to be deflected into the position for use thereof.

9. The locking device as claimed in claim 1, wherein the backrest is configured to form a partition wall between a passenger space and a luggage space of the motor vehicle.

* * * * *